(12) United States Patent
Ramachandra et al.

(10) Patent No.: US 11,374,971 B2
(45) Date of Patent: Jun. 28, 2022

(54) DECEPTION SERVER DEPLOYMENT

(71) Applicant: MICRO FOCUS LLC, Sanford, NC (US)

(72) Inventors: Pramod Kumar Ramachandra, Karnataka (IN); Hemant Kumar Chikkappaiah Honnapura, Karnataka (IN); Pramod Annachira Vitala, Karnataka (IN)

(73) Assignee: MICRO FOCUS LLC, Santa Clara, CA (US)

( * ) Notice: Subject to any disclaimer, the term of this patent is extended or adjusted under 35 U.S.C. 154(b) by 453 days.

(21) Appl. No.: 16/448,702

(22) Filed: Jun. 21, 2019

(65) Prior Publication Data

US 2020/0067981 A1    Feb. 27, 2020

(30) Foreign Application Priority Data

Aug. 24, 2018   (IN) .............................. 201841031850

(51) Int. Cl.
*H04L 9/40* (2022.01)
*G06F 9/455* (2018.01)
*H04L 41/12* (2022.01)
*H04L 43/08* (2022.01)
*H04L 47/70* (2022.01)

(52) U.S. Cl.
CPC ...... *H04L 63/1491* (2013.01); *G06F 9/45558* (2013.01); *H04L 41/12* (2013.01); *H04L 43/08* (2013.01); *H04L 47/82* (2013.01); *H04L 63/1416* (2013.01); *H04L 63/1425* (2013.01); *G06F 2009/4557* (2013.01); *G06F 2009/45595* (2013.01)

(58) Field of Classification Search
USPC .......................................................... 726/23
See application file for complete search history.

(56) References Cited

U.S. PATENT DOCUMENTS

| | | |
|---|---|---|
| 8,650,215 B2 | 2/2014 | Little |
| 9,553,885 B2 | 1/2017 | Touboul et al. |
| 9,588,821 B2 * | 3/2017 | Suit ........................ G06F 9/5077 |
| 9,979,750 B2 | 5/2018 | Wu et al. |
| 10,033,833 B2 * | 7/2018 | Fu ....................... H04L 41/0893 |

(Continued)

FOREIGN PATENT DOCUMENTS

| | | | | |
|---|---|---|---|---|
| CN | 107124299 A | * | 9/2017 | ............. H04L 41/06 |
| CN | 107667505 A | * | 2/2018 | ............. H04L 43/04 |
| EP | 2955894 A1 | | 12/2015 | |

OTHER PUBLICATIONS

Don Woodard; Cyber Resilience through Deception and Decoy; IST-153 Workshop on Cyber Resilience; Date Unknown (5 pages).

(Continued)

*Primary Examiner* — Sakinah White Taylor

(57) ABSTRACT

A system accesses information regarding a topology of an arrangement of resources, where one of the resources is a multi-tiered resource having a plurality of layers. Based on the information regarding the topology of the arrangement of resources, the system selects one or more layers of the multi-tiered resource for deployment of a deception server that has a reduced security mechanism to act as a decoy to attract attackers of the system. The system deploys the deception server at the selected one or more layers of the multi-tiered resource.

20 Claims, 4 Drawing Sheets

(56) References Cited

U.S. PATENT DOCUMENTS

| | | | |
|---|---|---|---|
| 10,200,246 B1* | 2/2019 | Rachamadugu | H04L 41/0846 |
| 2009/0049547 A1* | 2/2009 | Fan | H04L 63/1425 |
| | | | 726/22 |
| 2011/0022688 A1* | 1/2011 | Gvirtsman | H04L 41/12 |
| | | | 715/735 |
| 2013/0007216 A1* | 1/2013 | Fries | G06F 8/76 |
| | | | 709/218 |
| 2017/0048100 A1* | 2/2017 | Delinocci | H04L 41/065 |
| 2017/0134423 A1 | 5/2017 | Sysman et al. | |
| 2017/0237756 A1* | 8/2017 | Lietz | H04L 63/14 |
| | | | 726/23 |
| 2017/0289109 A1* | 10/2017 | Caragea | H04L 9/3249 |
| 2017/0331856 A1 | 11/2017 | Vissamsetty et al. | |
| 2018/0060106 A1* | 3/2018 | Madtha | H04L 41/12 |

OTHER PUBLICATIONS

Eric Cole; Deception Matters: Slowing Down the Adversary with illusive Networks®; A SANS Product Review; May 2017 (21 pages).

Holgado, et al; Evolving from Honeynets Deception-Based Responses Toward a Proactive and Dynamic Risk Management; 2015 (10 pages).

Wikipedia, Configuration management database last edited Jun. 19, 2018 (3 pages).

* cited by examiner

DECEPTION SERVER DEPLOYMENT

CROSS-REFERENCE TO RELATED APPLICATION

This application claims the benefit of Indian Application No. 201841031850 filed 24 Aug. 2018, which is hereby incorporated by reference.

BACKGROUND

A system can include an arrangement of electronic devices, such as user computers, server computers, storage devices, communication devices, applications, databases, and/or other resources. An attacker may attempt to gain unauthorized access to a network or an electronic device, to steal information accessible over the network or by the electronic device, to install malware, to cause an attack that slows down operation of the network or the electronic device or produces errors or faults, to encrypt data to render the data inaccessible, and/or to perform other malicious tasks.

BRIEF DESCRIPTION OF THE DRAWINGS

Some implementations of the present disclosure are described with respect to the following figures.

Figure 1:
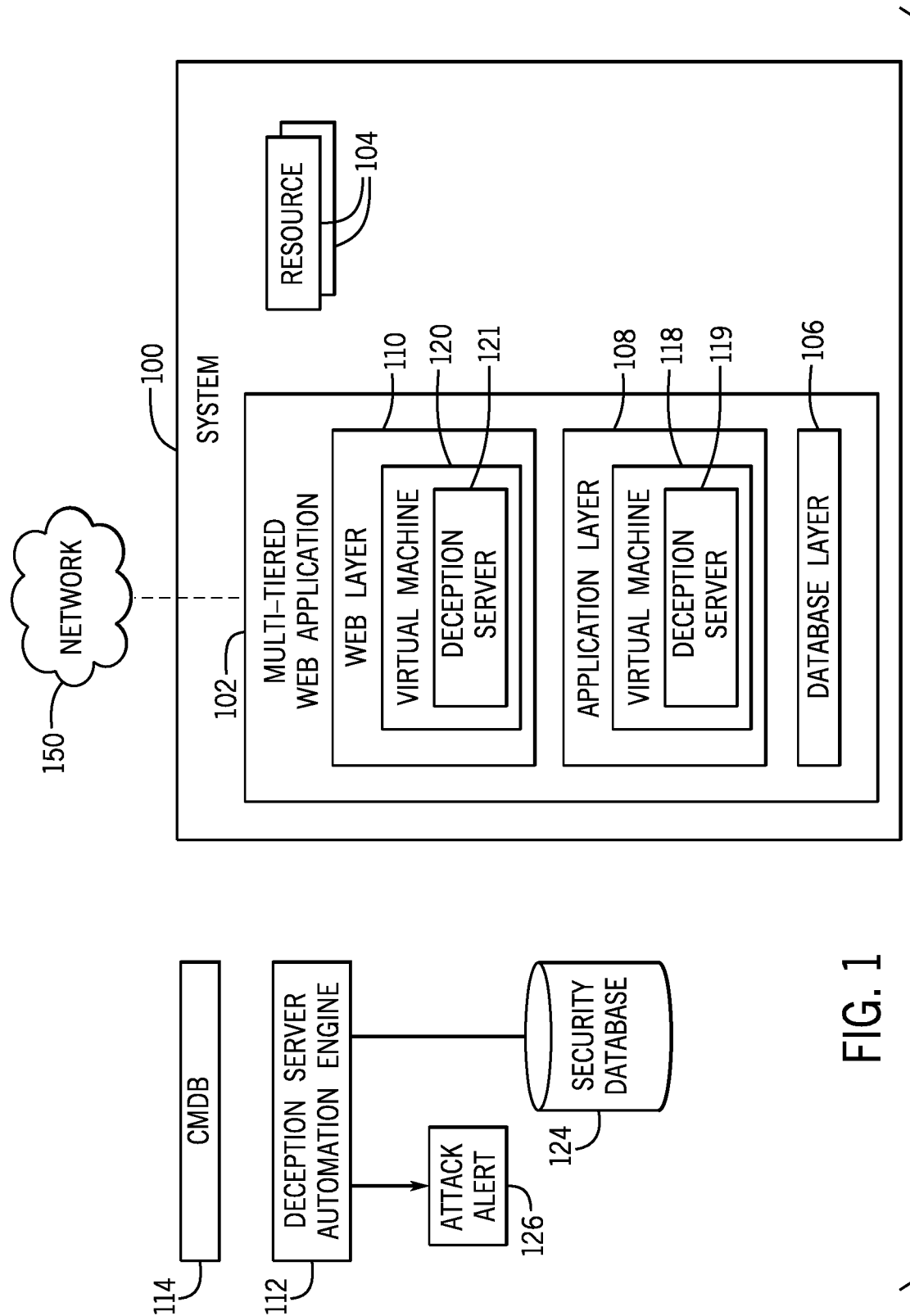
FIG. 1 is a block diagram of an arrangement that includes a deception server deployment engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An arrangement of resources within a system (such as a network, a cloud, etc.) can have a topology based on relationships among the resources. Examples of resources include user computers, server computers, storage devices, communication devices, applications, databases, virtual machines, and so forth. More generally, a "resource" can refer to any or some combination of a machine, machine-readable instructions, a data repository, or any other component that can be used to perform a task. Relationships among resources can refer to a relationship based on a physical connection between the resources, a relationship based on interaction between the resources that are either physically connected or are able to communicate with one another, a relationship in which one resource is included in another resource, a relationship specifying that a resource has multiple layers (such a resource is referred to as a multi-tiered resource), and so forth.

An example of a multi-tiered resource is a multi-tiered application that includes multiple layers. A multi-tiered application that has n layers (n>1) can be referred to as an n-tiered application. As examples, the multiple layers of a multi-tiered application can include a database layer (which includes a database that manages access and storage of data), an application layer (which includes a program accessible to perform specified tasks), and a web layer (which includes a program that presents a web resource accessible over a network).

An entity (referred to as an "attacker") may attempt to attack a layer (or multiple layers) of the multi-tiered resource. An attacker can include a machine, a program (including machine-readable instructions such as software and/or firmware), and/or a human. An attacker may select a layer (or multiple layers) of a multi-tiered resource for attack based on presence of a security loophole or other vulnerability in the selected layer(s) of the multi-tiered resource.

To detect potential malicious attacks of a system, deception servers can be deployed. A "deception server" can refer to a program and/or a machine that acts as a decoy for attracting attackers. The deception server can store decoy data (i.e., fake data that resembles real data) and/or run a program(s) that make(s) the deception server behave as if the deception server were an actual server of the system. An attacker that interacts with the deception server may believe that the attacker has accessed a real network or a real electronic device or program, but in actuality, the attacker may be in a decoy environment presented by the deception server that prevents the attacker from accessing the real resources of the system. Interactions with the deception server can be monitored, and data relating to such interactions can be stored in a security database. Based on the data associated with the interactions between the attacker and the deception server, an attack can be detected, and alerts can be issued and countermeasures can be deployed.

Without an understanding of the specific topology of an arrangement of resources in a system (e.g., a network, a cloud, etc.), it may be difficult to determine where deception servers should be deployed to be effective in detecting and counteracting attacks on the system. In some examples, a human may make manual decisions regarding where deception servers are to be deployed. Such decisions may not properly consider the actual topology of a system. Moreover, as the topology of a system changes (e.g., due to addition of a resource, removal of a resource, or changing of a resource), a deployed deception server at a specific location (such as at a specific resource) may no longer be capture attacks due to the change in the topology. Changes in the topology of the system may cause changes in relationship among resources, which may dictate changes in where the deception servers are to be deployed.

FIG. 1 is a block diagram of an example arrangement that includes a system 100 that has various resources, including a multi-tiered web application 102 and other resources 104. The system 100 can include a network, a cloud, or any other type of system. Although reference is made to the multi-tiered web application 102, it is noted that in other examples, other types of multi-tiered resources can be present in the system 100.

In the example of FIG. 1, the multi-tiered web application 102 includes a database layer 106, an application layer 108, and a web layer 110. Although specific example layers are shown in FIG. 1, it is noted that in other examples, other types of multi-tiered resources can include other types of layers.

The example arrangement of FIG. 1 also includes a deception server automation engine 112 that is able to deploy deception servers in the system 100, in accordance with some implementations of the present disclosure.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The deception server automation engine 112 is able to access information regarding the topology of an arrangement of resources (including the multi-tiered web application 102 and the resources 104). For a multi-tiered resource, the topology information can include information of the layers of the multi-tiered resource, such as the layers of the multi-tiered web application. The information of the layers can include information of a type of layer, the service provided by the type of layer, a security mechanism of the layer, a current version of a program or operating system of the layer, and so forth. In some examples, the accessed information can include information of a configuration management database (CMDB) 114. A CMDB is a data repository that houses information relating to a collection of resources, which are represented as configuration items (CIs) in the CMDB. The CMDB 114 also stores information relating to relationships between resources. As resources in the system 100 are discovered by a topology discovery engine (or engines) (not shown), information pertaining to such discovered resources (as represented by CIs) can be added by the topology discovery engine(s) to the CMDB 114. In addition, relationships between resources can also be discovered by the topology discovery engine(s), and relationship information can be added topology discovery engine(s) to the CMDB 114 pertaining to the relationships among the resources of the system 100. The topology discovery engine(s) can be associated with the CMDB 114.

Any changes to the resources or to the relationships among resources of the system 100 can be tracked by the topology discovery engine(s) and the corresponding information in the CMDB 114 can be updated to account for such changes.

The web application 102 is an application that is accessed over an external network 150, such as the Internet or an intranet. More generally, the web application 102 is an example of a multi-tiered resource that is to communicate with an entity over the external network 150, and traffic from the entity is processed by the multi-tiered resource.

In some examples, the database layer 106 of the web application 102 can include a database that stores information pertaining to activities of the web application 102. The application layer 108 can include an application server (e.g., a Java application server or another type of application server that provides a program that is accessible by other entities). The web layer 110 can include a web server (e.g., an Active Server Pages or ASP or ASP.net server, or another type of web server).

The deception server automation engine 112 selects, based on the information regarding the topology of the arrangement of resources of the system 100 (such as information accessed from the CMDB 114), a layer (or multiple layers) of the multi-tiered web application 102 for deployment of a deception server. The deception server automation engine 112 then deploys a deception server (or multiple deception servers) at the selected layer (or multiple selected layers) of the multi-tiered web application 102. It is noted that the deception server automation engine 112 can additionally or alternatively select a resource 104 (or multiple resources 104) in which to deploy a deception server(s).

Figure 2:
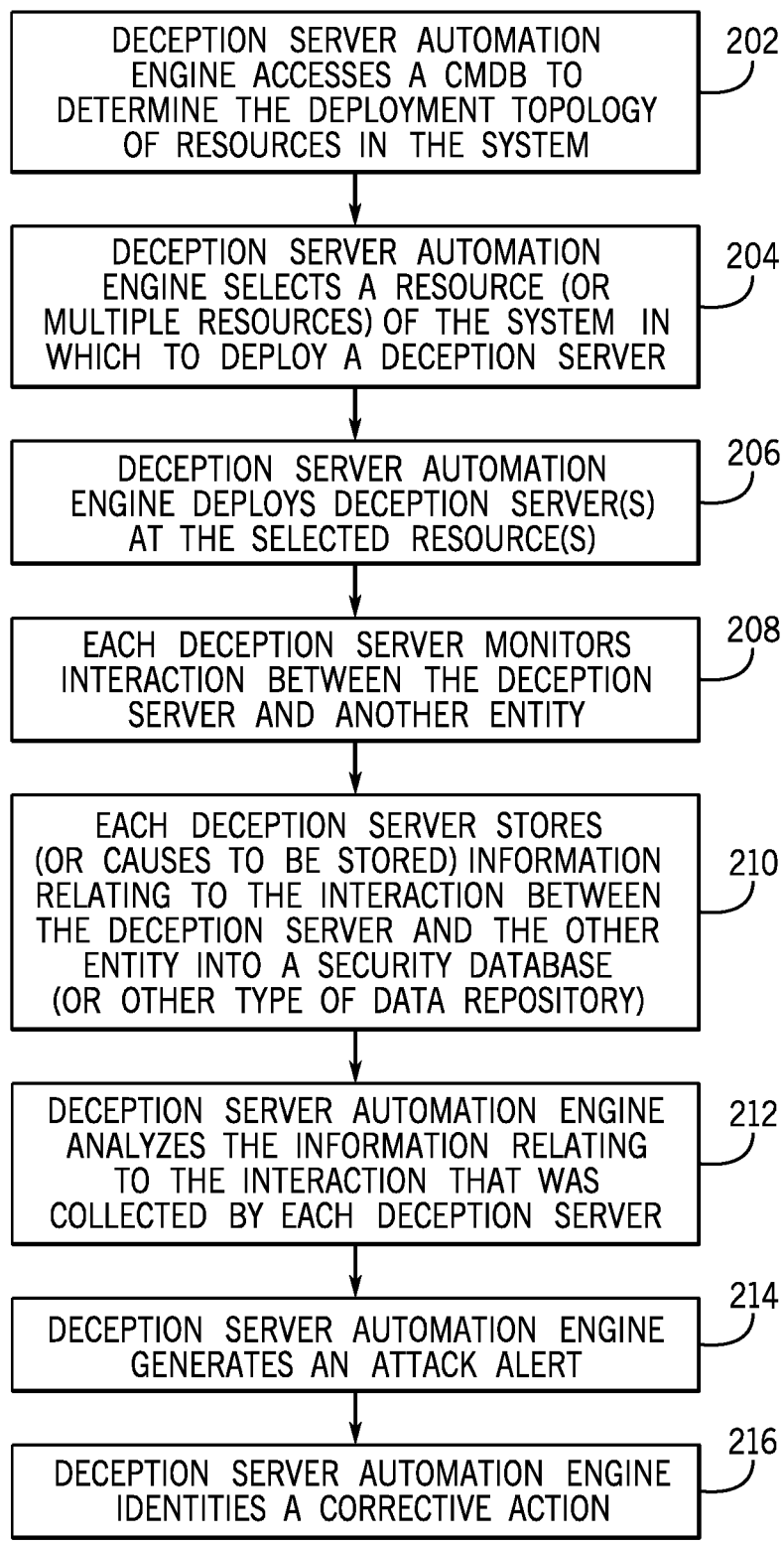
FIG. 2 is a flow diagram of a process according to some examples.

FIG. 2 is a flow diagram of a process performed by the arrangement of FIG. 1 according to some examples. The ensuing discussion refers to both FIGS. 1 and 2.

The deception server automation engine 112 accesses (at 202) the CMDB 114 to determine the deployment topology of resources in the system 100, including various layers of a multi-tiered resource (such as the multi-tiered web application 102). In some examples, the deception server automation engine 112 can issue Topology Query Language (TQL) queries to the CMDB 114 to retrieve requested topology information. In other examples, the deception server automation engine 112 can access the CMDB 114 or another repository of topology information using different techniques.

Based on the information of the deployment topology retrieved from the CMDB 114, the deception server automation engine 112 selects (at 204) a resource (or multiple resources) of the system 100 in which to deploy a deception server. The selection of a resource can include selecting a layer (or multiple layers) of a multi-tiered resource such as the multi-tiered web application 102.

In the example of FIG. 1, the resources selected for deployment of deception servers include the application layer 108 and the web layer 110 of the multi-tiered web application 102.

The selection of a resource in which to deploy a deception server can be based on a set of rules, which can be defined by an administrator (such as in a user interface presented by the deception server automation engine 112) or can be dynamically established. A rule can be generic (i.e., can apply to any topology of multiple topologies of resources), or a rule can be specific for a particular topology of resources. The rule can also specify a type of deception server to deploy for a respective type of resource. For example, in a multi-layered resource, different deception servers can be deployed in different layers of the multi-layered resource.

The following provides examples of rules that can be established. A first rule can specify that if the topology discovered is a two-tiered web application, then a web deception server can be deployed at a web layer (e.g., 110 in FIG. 1).

A second rule can specify that if the topology discovered is a three-tiered web application, then three deception servers can be deployed, including a web deception server at a web layer (e.g., 110), an application deception server at an application layer (e.g., 109), and a database deception server at a database layer (e.g., 106).

The deception server automation engine 112 deploys (at 206) deception server(s) at the selected resource(s), including at selected layer(s) of multi-tiered resource(s). In some examples, deploying a deception server includes deploying a virtual machine (VM). In FIG. 1, the deception server automation engine 112 deploys a VM 118 in the application layer 108, and deploys a VM 120 in the web layer 110. The VM 118 deployed in the application layer 108 includes a deception server 119, and the VM 120 deployed in the web layer 110 includes a deception server 121.

A VM emulates a physical machine. A VM can include various machine-readable instructions, including a deception server, an operating system, and/or a program to perform respective tasks. Multiple VMs can be deployed on one physical machine, and the multiple VMs can share the physical processing components, storage components, communication components, input/output (I/O) components, and/or other components of the physical machine. In some examples, a VM can be created from a predefined template, in the form of a server image for example. The template can include code relating to the deception server, an operating system, and/or a program to be deployed in the VM.

A deployed deception server (e.g., 119 or 121) can lure an attacker. A deception server can have no security mechanism or a reduced security mechanism, such as a security mechanism that uses a weak password. As another example, a deception server can include an operating system or program that has not been updated with the latest security patches, and thus may have a security loophole or other vulnerability. Also, a deception server may have ports that are open to allow for an attacker to gain access to the deception server.

Each deception server 119 or 121 of the respective VM 118 or 120 can monitor (at 208) interaction between the deception server and another entity, such as an attacker. Each deception server 119 or 121 (or a different program in the respective VM) can store (or cause to be stored) (at 210) information relating to the interaction between the deception server and the other entity into a security database 124 (or other type of data repository). For example, the deception server or a different program of the respective VM can write the information relating to the interaction to the security database 124, or can send the information relating to the interaction to the deception server automation engine 112, which can then store the information in the security database 124.

In other examples, the monitoring of the interactions between the deception server 119 or 121 and another entity can be performed by a monitoring program (in the respective VM) different from the deception server.

Data that can be acquired as part of the monitoring (at 208) can include an identifier of the entity interacting with the deception server, a geographical location associated with the entity, a network address (such as an Internet Protocol (IP) address or a Medium Access Control (MAC) address) associated with the entity, a type of attack being carried out, a possible intent of the attack, the amount of damage that can be caused by the attack, a timestamp of the interaction, and so forth.

The deception server automation engine 112 analyzes (at 212) the information relating to the interaction that was collected by each deception server 119 or 121. Based on the analysis, the deception server automation engine 112 is able to detect an attack of a specific resource (or resources). The deception server automation engine 112 can generate (at 214) an attack alert 126 (e.g., an email notification, a text message, a graphical alert, etc.) that provides information of the attack. Additionally, the attack alert 126 can include a report including information regarding an attack, for communication to various stakeholders of an organization, where stakeholders can include security experts, network administrators, system architects, management personnel, programs, machines, and so forth.

Tasks 208, 210, and 212 are part of real-time monitoring for attacks of the system 100. To reduce the amount of damage, reduce the amount of stolen data, and/or reduce the loss of data, the real-time monitoring can perform the detection and provide alerts as the attacks are occurring.

In some examples, the deception server automation engine 112 can identify (at 216) a corrective action to take in response to an alert. The deception server automation engine 112 can cause implementation of the identified corrective action, such as deploying or activating a firewall, activate scanning by an anti-malware program, closing a port, deactivating or shutting down a program, deactivating or shutting down a machine, disabling a user from accessing a network or a device, activating an intrusion prevention program, activating a denial of service (DoS) attack handler, and so forth.

Figure 3:
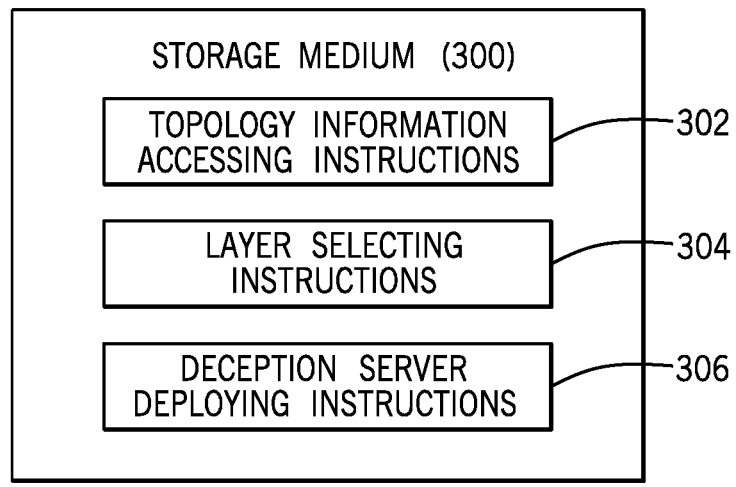
FIG. 3 is a block diagram of a storage medium storing machine-readable instructions according to some examples.

FIG. 3 is a block diagram of a non-transitory machine-readable or computer-readable storage medium 300 comprising machine-readable instructions that upon execution cause a system to perform various tasks.

The machine-readable instructions include topology information accessing instructions 302 to access information regarding a topology of an arrangement of resources, where a resource of the resources includes a multi-tiered resource having a plurality of layers. The machine-readable instructions further include layer selecting instructions 304 to, based on the information regarding the topology of the arrangement of resources, select one or more layers of the multi-tiered resource for deployment of a deception server. The machine-readable instructions further include deception server deploying instructions 306 to deploy one or more deception servers at the selected one or more layers of the multi-tiered resource.

Figure 4:
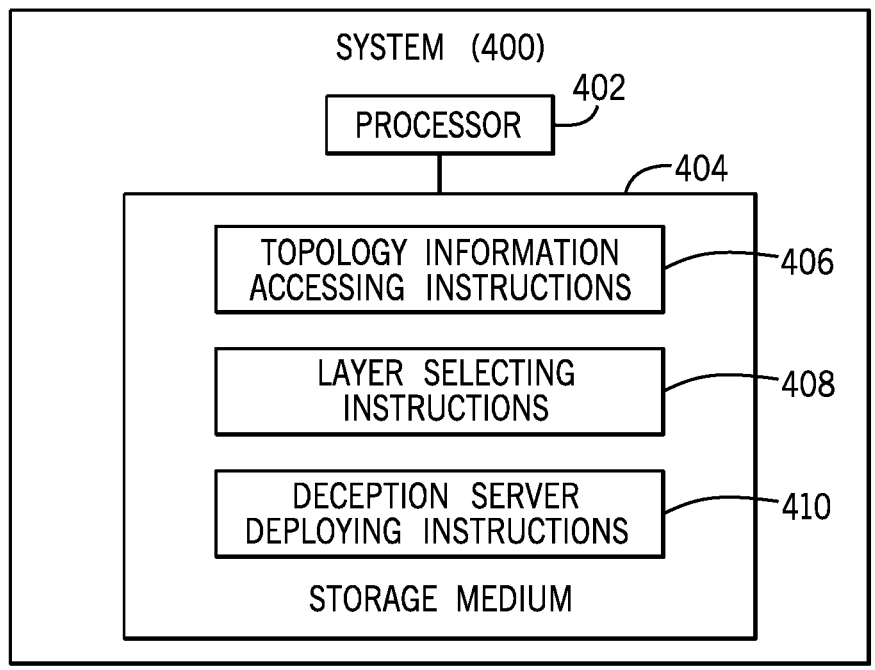
FIG. 4 is a block diagram of a system according to some examples.

FIG. 4 is a block diagram of a system 400 that includes a processor 402 (or multiple processors). A processor can include a microprocessor, a core of a multi-core microprocessor, a microcontroller, a programmable integrated circuit, a programmable gate array, or another hardware processing circuit.

The system 400 further includes a non-transitory storage medium 404 storing machine-readable instructions executable on the processor 402 to perform various tasks. Machine-readable instructions executable on a processor can refer to machine-readable instructions executable on a single processor or multiple processors.

The machine-readable instructions in the storage medium 404 can include topology information accessing instructions 406 to access information regarding a topology of an arrangement of resources, wherein a resource of the resources comprises a multi-tiered resource comprising a plurality of layers, and the information comprises information regarding the plurality of layers of the multi-tiered resource. The machine-readable instructions further include layer selecting instructions 408 to, based on the information regarding the topology of the arrangement of resources, select one or more layers of the multi-tiered resource for deployment of a deception server. The machine-readable instructions further include deception server deploying instructions 410 to cause deployment of one or more deception servers at the selected one or more layers of the multi-tiered resource.

Figure 5:
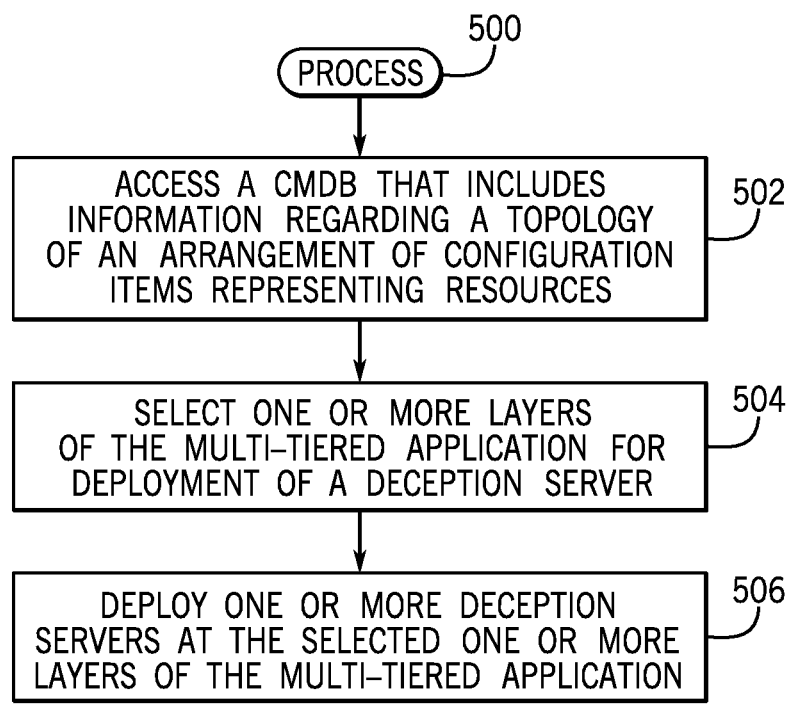
FIG. 5 is a flow diagram of a process according to further examples.

FIG. 5 is a flow diagram of a process 500 according to some examples. The process 500 includes accessing (at 502) a CMDB that includes information regarding a topology of an arrangement of configuration items representing resources, where a resource of the resources includes a multi-tiered application comprising a plurality of layers.

The process 500 further includes, based on the information of the CMDB, selecting (at 504) one or more layers of the multi-tiered application for deployment of a deception server. The process 500 further includes deploying (at 506) one or more deception servers at the selected one or more layers of the multi-tiered application.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a processor of a system to:
   access a configuration management database (CMDB) to obtain information regarding a topology of an arrangement of resources in a network, wherein one of the resources comprises a multi-tiered resource including a web layer and an application layer, and the obtained information includes information of the web layer and the application layer of the multi-tiered resource;
   based on the obtained information regarding the topology of the arrangement of the resources, select one layer of the web layer and the application layer of the multi-tiered resource for deployment of a deception server, wherein the deception server is a server having a reduced security mechanism to attract potential attackers of the network;
   deploy the deception server in the selected layer of the multi-tiered resource;
   monitor information relating to interactions between the deception server and external entities;
   based on the monitored information, identify an attacker of the multi-tiered resource; and
   in response to identifying the attacker, implement a remedial action including disabling the attacker from accessing the multi-tiered resource.

2. The non-transitory machine-readable storage medium of claim 1, wherein the instructions upon execution cause the processor to:
   select the web layer and the application layer of the multi-tiered resource for deployment of plural deception servers; and
   deploy the plural deception servers in the web layer and the application layer of the multi-tiered resource.

3. The non-transitory machine-readable storage medium of claim 1, wherein the multi-tiered resource comprises a multi-tiered application.

4. The non-transitory machine-readable storage medium of claim 3, wherein the multi-tiered application comprises a multi-tiered web application.

5. The non-transitory machine-readable storage medium of claim 1, wherein the instructions that cause the processor to deploy the deception server include instructions that cause the processor to deploy a virtual machine at the selected layer of the multi-tiered resource.

6. The non-transitory machine-readable storage medium of claim 5, wherein the virtual machine is deployed from a server image.

7. The non-transitory machine-readable storage medium of claim 5, wherein the instructions upon execution cause the processor to:
   store information gathered by the virtual machine relating to an interaction by an external entity with the deception server; and
   detect an attack based on the information relating to the interaction.

8. The non-transitory machine-readable storage medium of claim 7, wherein the instructions upon execution cause the processor to:
   store the monitored information in a security server.

9. The non-transitory machine-readable storage medium of claim 1, wherein the multi-tiered resource is to communicate with an external entity over an external network, and traffic from the external entity is processed by the multi-tiered resource.

10. A system comprising:
    a processor; and
    a non-transitory storage medium storing instructions executable on the processor to:
      access a configuration management database (CMDB) to obtain information regarding a topology of an arrangement of resources in a network, wherein one of the resources comprises a multi-tiered resource including a web layer and an application layer, and the obtained information comprises information of the web layer and the application layer of the multi-tiered resource;
      based on the obtained information regarding the topology of the arrangement of the resources, select one layer of the web layer and the application layer of the multi-tiered resource for deployment of a deception server, wherein the deception server is a server having a reduced security mechanism to attract potential attackers of the network;
      deploy the deception server in the selected layer of the multi-tiered resource;
      monitor information relating to interactions between the deception server and external entities;
      based on the monitored information, identify an attacker of the multi-tiered resource; and
      in response to identifying the attacker, implement a remedial action including disabling the attacker from accessing the multi-tiered resource.

11. The system of claim 10, wherein the instructions are executable on the processor to:

select the web layer and the application layer of the multi-tiered resource for deployment of plural deception servers; and deploy the plural deception servers in the web layer and the application layer of the multi-tiered resource.

12. The system of claim 11, wherein the plural deception servers deployed in the web layer and the application layer of the multi-tiered resource are to collect data relating to attacks of the multi-tiered resource.

13. The system of claim 10, wherein the obtained information regarding the topology of the arrangement of the resources comprises information of configuration items corresponding to the resources, and information of relationships among the configuration items.

14. The system of claim 10, wherein the deception server is deployed in a virtual machine in the selected layer of the multi-tiered resource.

15. The system of claim 14, wherein the virtual machine is created based on a predefined template.

16. The system of claim 10, wherein the instructions are executable on the processor to;

store the monitored information in a security database.

17. A method performed by a system comprising a hardware processor, comprising:

accessing a configuration management database to obtain information regarding a topology of an arrangement of resources in a network, wherein one of the resources comprises a multi-tiered resource including a web layer and an application layer, and the obtained information includes information of the web layer and the application layer of the multi-tiered resource;

based on the obtained information regarding the topology of the arrangement of the resources, select one layer of the web layer and the application layer of the multi-tiered resource for deployment of a deception server, wherein the deception server is a server having a reduced security mechanism to attract potential attackers of the network;

deploying the deception server in the selected layer of the multi-tiered resource: application monitoring information relating to interactions between the deception server and external entities;

based on the monitored information, identify an attacker of the multi-tiered resource and in response to identifying the attacker, implement a remedial action including disabling the attacker from accessing the multi-tiered resource.

18. The method of claim 17, wherein deploying the deception server comprises deploying a virtual machine comprising the deception server, the virtual machine created from a predefined template.

19. The method of claim 17, further comprising:

storing the monitored information in a security database.

20. The method of claim 17, further comprising:

selecting the web layer and the application layer of the multi-tiered resource for deployment of plural deception servers: and deploying the plural deception servers in the web layer and the application layer of the multi-tiered resource.

* * * * *